Jan. 10, 1967  A. S. HAWKINS  3,297,278
VERTICAL RISING AERODYNAMIC VEHICLES
Filed Dec. 4, 1964
FIG. 2.
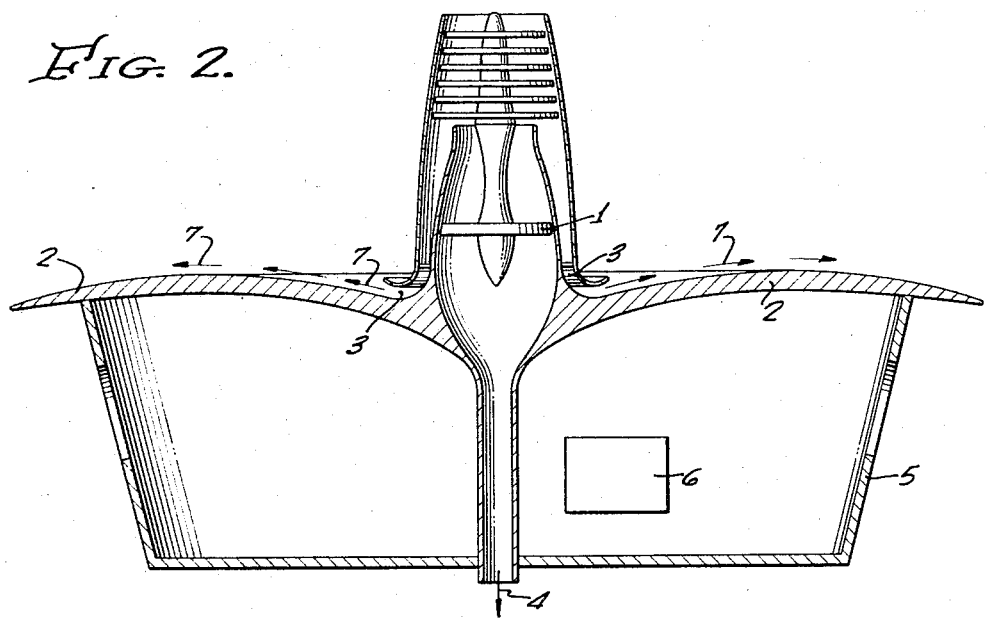
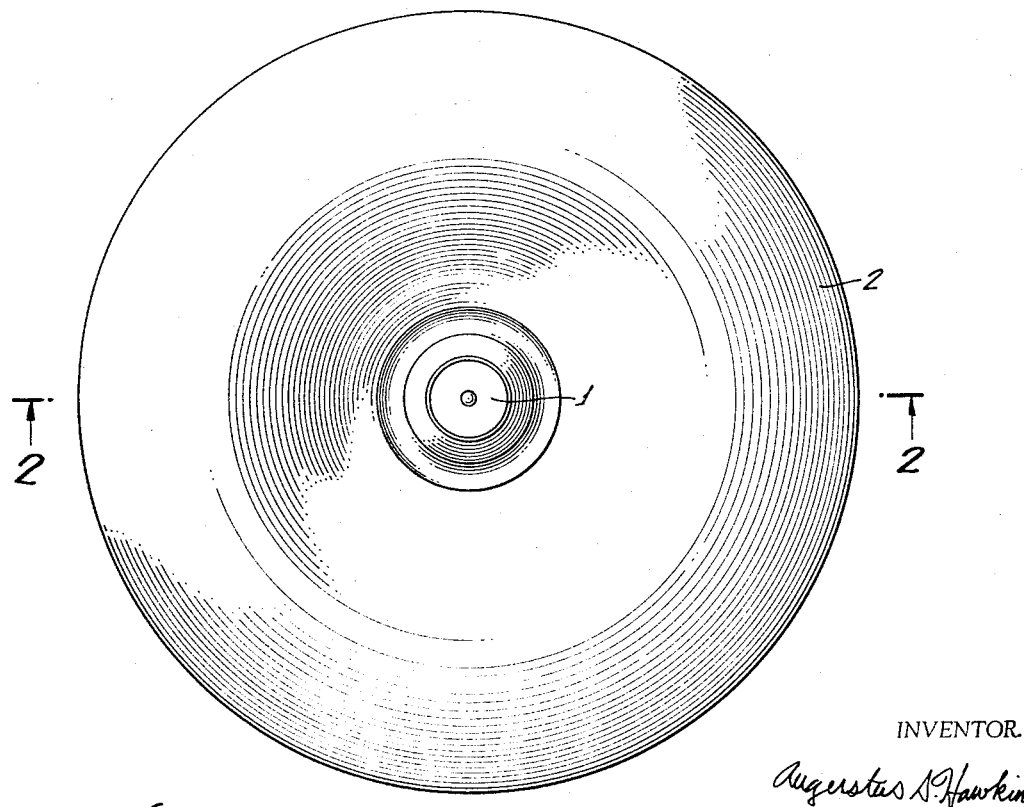
FIG. 1.
INVENTOR.
Augustus S. Hawkins United States Patent Office 3,297,278
Patented Jan. 10, 1967

3,297,278
VERTICAL RISING AERODYNAMIC VEHICLES
Augustus S. Hawkins, 1893 Skyline Drive,
Santa Ana, Calif. 92705
Filed Dec. 4, 1964, Ser. No. 415,952
2 Claims. (Cl. 244—23)

This invention relates to apparatus for vertical flight. The object of the invention is to provide a vehicle for safe direct vertical ascension and vertical descension to a small take-off and landing area. Existing means providing vertical flight involve rockets which essentially make the landing area untenable, helicopters which require a relatively large area because of the space needed by the rotating blades, which blades also involve a hazard, and so-called VTOL aircraft which require a landing area which is in essence a much shortened runway. The object of my invention is further to eliminate the disadvantages of each of these modes as set forth in the foregoing.

An additional objective of my invention is to provide a vehicle in which the only essential moving parts comprise the central shaft and rotating blades of the turbine and compressor, thus making for great simplicity, reliability and economy of construction.

My invention comprises a vehicle built around a central vertical axis. A standard turbojet engine is mounted vertically on this axis, said engine differing from the usual propjet engine in that the air compressor section thereof is greatly amplified so that the essential power generated by the engine is delivered in the form of a jet of air thru an annular nozzle in a plane at right angles to the axis.

Further, my invention comprises an airfoil section in which the lead edge forms a circle, the trailing edge obviously also forms a circle. The airfoil section is essentially in the form of a disc. This airfoil section is so located approximately at right angles to the vertical axis with respect to the annular jet of air provided by the engine so that this jet of air flows over the airfoil section, thus providing lift. Additionally, the exhaust thrust from the engine will be moving parallel to the axis and directly down, thus providing additional lift.

One embodiment of the invention is illustrated in the accompanying drawings. FIGURE 1 shows a plan view of the essential parts of the vehicle. FIGURE 2 is the cross section thru the axis showing the essential parts. My improved vertical motion vehicle comprises the engine 1, the airfoil 2, the annular discharge of the air from the engine compressor 3, the exhaust jet from the engine 4, an anuular cabin 5, with control board 6, air flow over the airfoil section 7 to provide the vacuum, which results in the lift.

I claim:
1. A vehicle comprising a turbo-compressor engine mounted vertically, a disc-shaped annular airfoil section substantially at right angles to the axis of said engine, said section being so located with respect to said engine that air, generated by the compressor of said engine and discharged annularly by said engine, flows over said airfoil section to provide lift, said lift being augmented by the jet exhaust discharge from said engine.

2. A vehicle comprising a turbo-compressor engine mounted vertically, a disc-shaped annular airfoil section substantially at right angles to the axis of said engine, said section being so located with respect to said engine that air, generated by the compressor of said engine and discharged annularly by said engine, flows over said airfoil section to provide lift, said lift being further augmented by the jet exhaust discharge from said engine, and an annular enclosure at right angles to the axis of said engine mounted substantially below said airfoil section, said annular enclosure providing space for engine controls, personnel, and cargo.

References Cited by the Examiner
FOREIGN PATENTS
909,466   10/1962   Great Britain.

MILTON BUCHLER, *Primary Examiner.*

FERGUS S. MIDDLETON, L. C. HALL, A. E. CORRIGAN, *Assistant Examiners.*